UNITED STATES PATENT OFFICE.

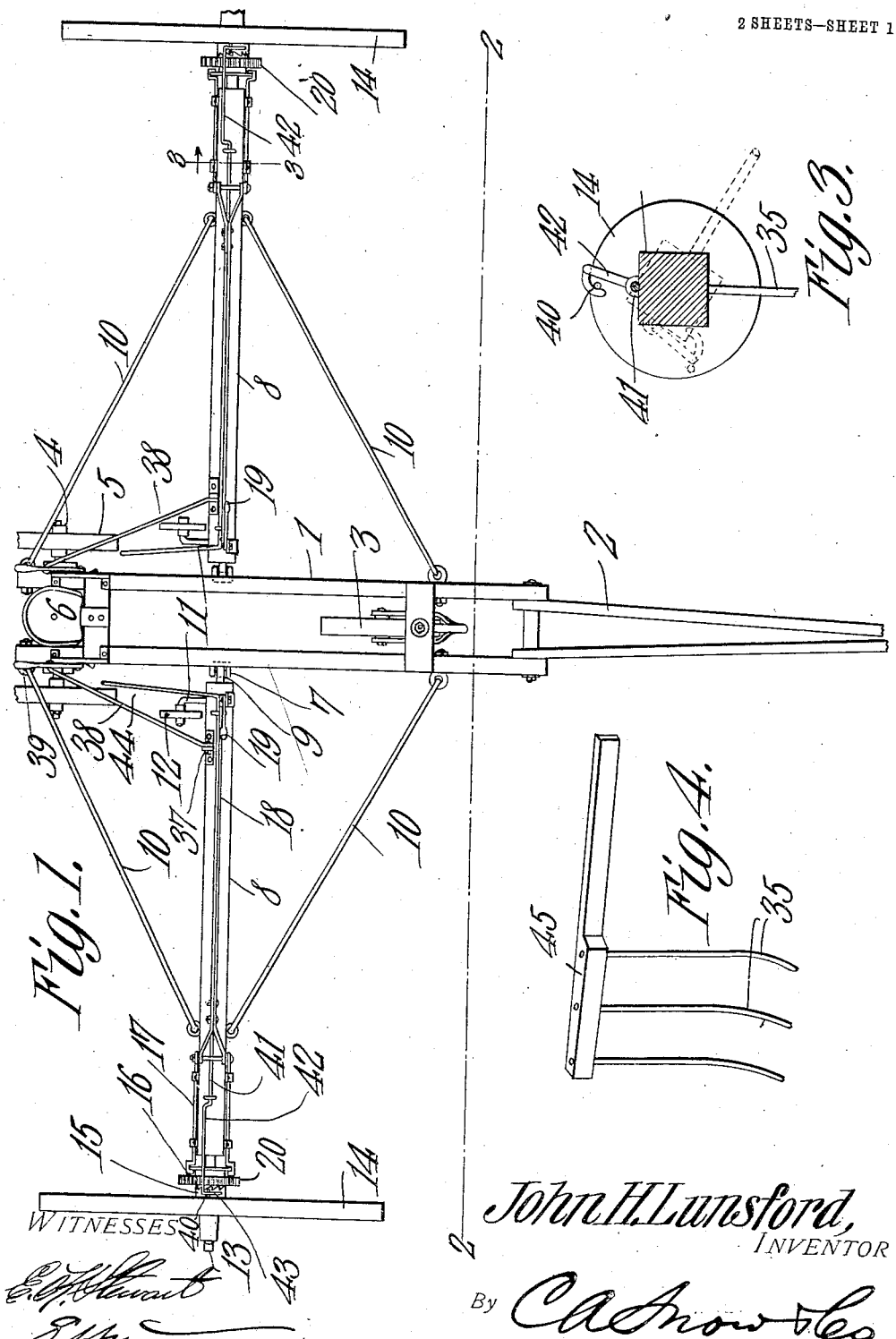

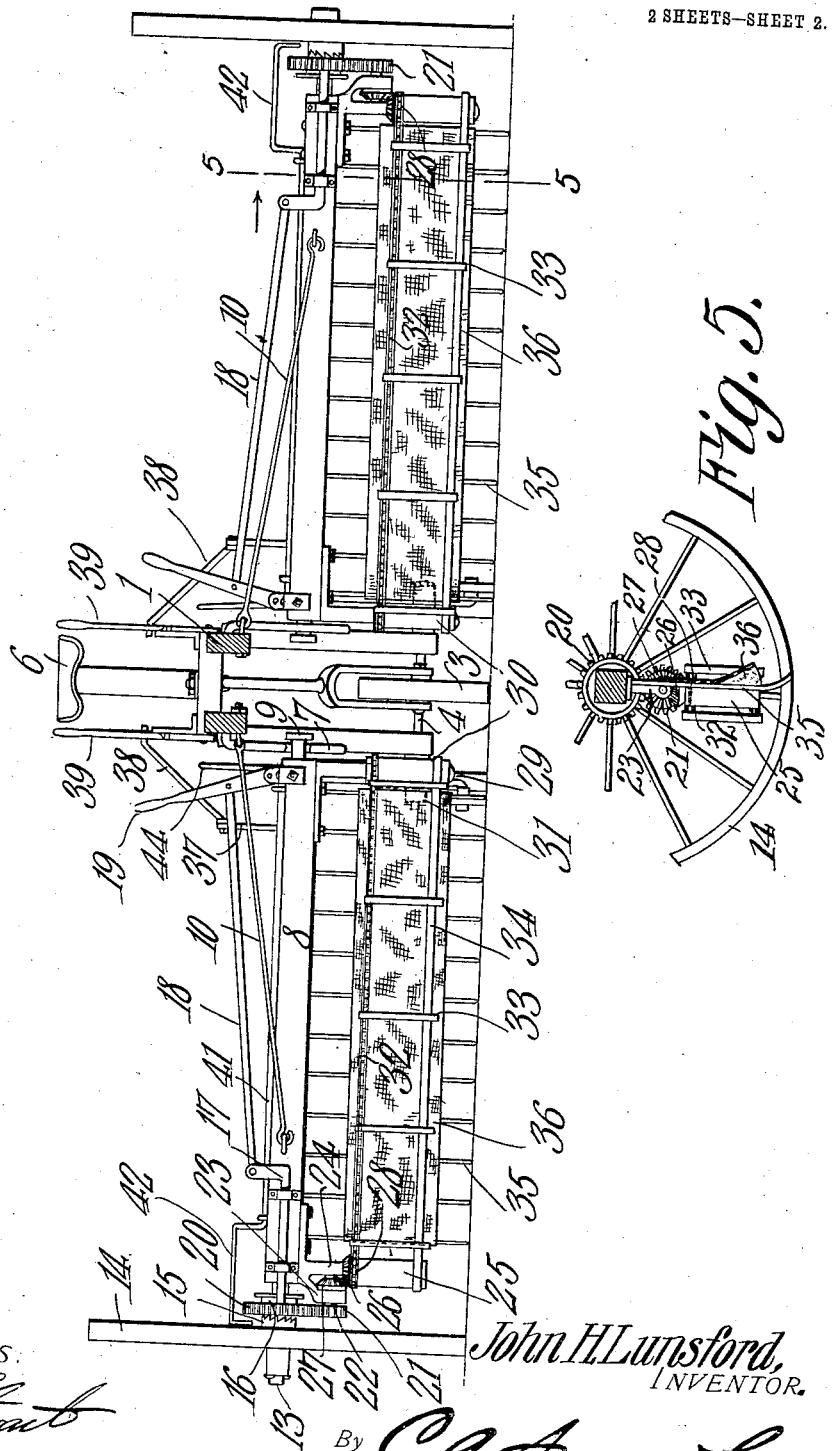

JOHN H. LUNSFORD, OF LAKESIDE, NEBRASKA.

COMBINED CENTER-DELIVERY AND DUMPING HAY-RAKE.

No. 898,240.   Specification of Letters Patent.   Patented Sept. 8, 1908.

Application filed July 8, 1907. Serial No. 382,687.

*To all whom it may concern:*

Be it known that I, JOHN H. LUNSFORD, a citizen of the United States, residing at Lakeside, in the county of Sheridan and State of Nebraska, have invented a new and useful Combined Center-Delivery and Dumping Hay-Rake, of which the following is a specification.

This invention has relation to combined center delivery and dumping hay rakes and it consists in the novel construction and arrangement of its parts as hereinafter shown and described.

The object of the invention is to provide a rake which may be manipulated so as to gather the hay and carry the same to the center of the rake where it is deposited in a wind row or the rake may be so manipulated that it will collect the hay without conveying the same to the center and which may be manually or automatically operated at intervals for dumping the hay.

The rake consists primarily of a truck mounted upon three wheels, the foremost one of which is preferably in the form of a caster wheel located at the middle of the truck and the rear wheels are journaled upon an axle and are located at the sides of the middle of the truck. Rake wings are located upon opposite sides of the truck and may move vertically with relation to the same. The said wings are supported upon ground wheels, the outer ones of which are traction wheels and are operatively connected with the means for moving the hay toward the center of the rake. Each wing consists primarily of a beam to which is attached a series of tines. Brace rods connect the outer portions of the beams with the forward and rear portions of the truck but said beams are free to move vertically with relation to the truck. Means are provided for throwing the traction wheels out of gear with the center delivery mechanism. Levers are mounted upon the truck and are operatively connected with the beams for swinging the same axially in order to dump the hay; also, a trip mechanism may be applied to the traction wheels for engaging trip rods mounted upon the beams whereby the said beams may be turned axially at regular intervals for dumping the hay.

In the accompanying drawing:—Figure 1 is a top plan view of the rake. Fig. 2 is a vertical front sectional view of the same cut on the line 2—2 of Fig. 1. Fig. 3 is a transverse sectional view of one of the rake beams cut on the line 3—3 of Fig. 1 with parts removed. Fig. 4 is a perspective view of an attachment for the rake. Fig. 5 is a vertical sectional view on the line 5, 5 of Fig. 2.

The truck of the rake consists of the frame 1 to the forward end of which is attached a tongue 2. The caster wheel 3 supports the forward portion of the frame 1 and the rear portion of the said frame is mounted upon an axle 4 upon which are journaled the ground wheels 5. The said wheels 5 are located beyond the outer sides of the frame 1. An operator's seat 6 is mounted upon the frame. The sides of the frame 1 are provided at intermediate points with the vertically disposed guides 7.

In as much as the rake wings are of the same construction and arrangement of parts a description of one will answer for both. Each wing consists of a beam 8 which is provided at its inner end with a headed stud 9 which operates in the guide 7. The brace rods 10 are connected at their outer ends to the outer portions of the beams 8 and at their inner ends to the front and rear portions of the side of the frame 1. The crank shaft 11 depends from the inner end portion of the beam 8 and the ground wheel 12 is journaled upon the crank of the said shaft. The spindle 13 is attached to the outer end of the beam 8 and the traction wheel 14 is journaled upon the spindle 13. The wheel 14 is provided with a hub clutch 15 which is adapted to be engaged and disengaged by the clutch member 16 which is slidably mounted upon the spindle 13. The sliding bars 17 are connected at their outer ends with the clutch member 16 and the rod 18 is connected to the said bars 17. The inner end of the rod 18 is pivotally connected with the lever 19 which is fulcrumed at the inner end of the beam 8.

From the foregoing description it is obvious that by manipulating the lever 19 the clutch member 16 may be moved in or out of gear with the clutch hub 15 of the traction wheel 14. The gear wheel 20 is carried by the clutch member 16 and meshes with the gear wheel 21 which in turn is mounted upon a stub shaft 22 journaled in the bracket 23. The bracket is supported by the beam 8. The element 24 depends from the bracket 23 and the roller 25 is journaled upon the said element. Said roller is provided at its upper end with a beveled pinion 26 which meshes with the beveled pinion 27 also mounted upon the stub shaft 22. The upper portion of the roller 25 is provided with sprocket teeth 28. The element 29 depends from the inner end of the beam 8 and the roller 30 is journaled upon the last said element. The said roller 30 is provided with sprocket teeth 31 and the sprocket chain 32 passes around the teeth 28 and 31 and the respective rollers carrying the same. The vertically disposed slats 33 depend from the chain 32 and support the band or belt 34 in parallel relation to the said chain but spaced from the same. The belt 34 passes around the lower portion of the rollers 25 and 30. The spring tines 35 depend from the beam 8 and are located within the front and rear sides of the chain 32 and the belt 34. The said tines support a flexible backing 36 which may be of canvas or other suitable material and is located between the front and rear sides of the conveyer formed by the chain and belt and the depending slats. The stud 37 is erected upon the beam 8 and is connected by means of a link 38 with an operating lever 39 which is fulcrumed upon the frame 1. By swinging the lever 39 it is obvious that the beam 8 may be turned axially upon the stud 9 and the spindle 13 as pivots. It is also obvious that the stud 9 may move vertically in the guide 7 and the rake wing will be held in proper position upon the surface of the ground by the wheels 12 and 14 even should the truck pass over elevations or depressions in the ground.

When the implement is used as a center delivery rake the clutch member 16 is thrown in gear with the clutch hub 15 and as the wheel 14 rotates rotary movement is transmitted to the gear wheels 20 and 21 to the shaft 22 which, through the beveled pinions 27 and 26, transmit rotary movement to the roller 25. Thus the forward portion of the conveyer is moved toward the roller 30 and as the hay is gathered by the tines 35 and forced up against the flexible backing 36, the slats 33 engage the hay and carry the same toward the truck. If, however, it is desired to have a dumping rake which is automatically actuated at regular intervals the clutch member 16 is moved out of engagement with the clutch hub 15 and a pin 40 is inserted in the inner side of the ground wheel 14. The rod 41 is journaled upon the beam 8 and is provided at its outer end with the portion 42 which extends out beyond the center of the traction wheel 14. The outer extremity of the portion 42 is bent into the path of the pin 40 so that the said pin will engage and escape the extremity 42 at each revolution of the traction wheel 14, but during the time that the said pin engages the extremity 42 and the time that it disengages the same it transmits to the rod 41 an axial turn describing a partial rotation which brings the end 44 thereof up into engagement with the lever 19 and the beam 8 is turned axially sufficiently to dump the hay previously gathered. When it is desired to use the implement as a dumping rake the tine section 45 may be placed between the inner ends of the beams 8, 8 and thus a continuous set of tines will extend practically from one traction wheel to the other and under the frame of the truck.

Having described my invention what I claim as new and desire to secure by Letters-Patent is:—

1. An implement as described comprising a truck, a rake member attached thereto and adapted to move vertically with relation to the same, wheels supporting said member and means for turning the member on an axis the axial movement being additional to the vertical movement.

2. An implement as described comprising a truck, a rake member attached thereto and adapted to move vertically while in raking position with relation to the truck and a wheel supporting said member.

3. An implement as described comprising a truck, a vertically disposed guide carried by the same, a rake member having a stud located in said guide, and wheels supporting said member.

4. An implement as described comprising a truck, a rake member attached to the same and adapted to move vertically with relation thereto, a wheel supporting said member and means operated by said wheel for turning the member axially, the axial movement being additional to the vertical movement.

5. An implement as described comprising a truck, a beam attached thereto and adapted to move vertically with relation thereto, said beam carrying tines, a conveyer moving transversely of the tines and moving vertically with the same and a traction wheel operatively connected with the conveyer.

6. In a rake, a beam, tines depending therefrom, a flexible backing attachment to the tines, a conveyer moving transversely of the tines and a traction wheel operatively connected with the conveyer.

7. In a rake, a beam, tines depending therefrom, a conveyer moving in an orbit about the tines and means for moving the conveyer.

8. In a rake, a beam, tines depending therefrom, a conveyer moving in an orbit about the tines and a traction wheel operatively connected with the conveyer.

9. In a rake, a beam attached thereto and having vertical movement with relation to the portion of the rake to which it is attached and adapted to turn upon an axis, said axial movement being additional to the vertical movement, tines depending from the beam, a conveyer mounted for movement transversely of the tines and means for moving the conveyer.

10. In a rake, a beam mounted for movement upon an axis, tines depending from the beam, a conveyer moving in an orbit about the tines and means for moving the conveyer.

11. In a rake, a beam, tines depending from the beam, members depending from the beam, rollers journaled upon the members, a conveyer passing around the rollers and moving in an orbit about the tines and means for operating the conveyer.

12. In a rake, a beam, tines depending therefrom, members depending from the beam, rollers journaled upon the members, a conveyer passing around the rollers and a traction wheel for operating the conveyer.

13. In a rake, a beam, tines depending therefrom, members depending therefrom, rollers journaled upon the members, a conveyer passing around said rollers, a traction wheel journaled at the end of the beam and being operatively connected with the conveyer.

In testimony that I claim the foregoing as my own, I have hereto affixed my signature in the presence of two witnesses.

JOHN H. LUNSFORD.

Witnesses:
C. E. CROWTHER,
LOTTIE CROWTHER.